June 18, 1963  J. P. KENNY ETAL  3,094,152
LIQUID DISPENSING DEVICE FOR FLOOR MACHINES
Filed Jan. 26, 1962  2 Sheets-Sheet 1
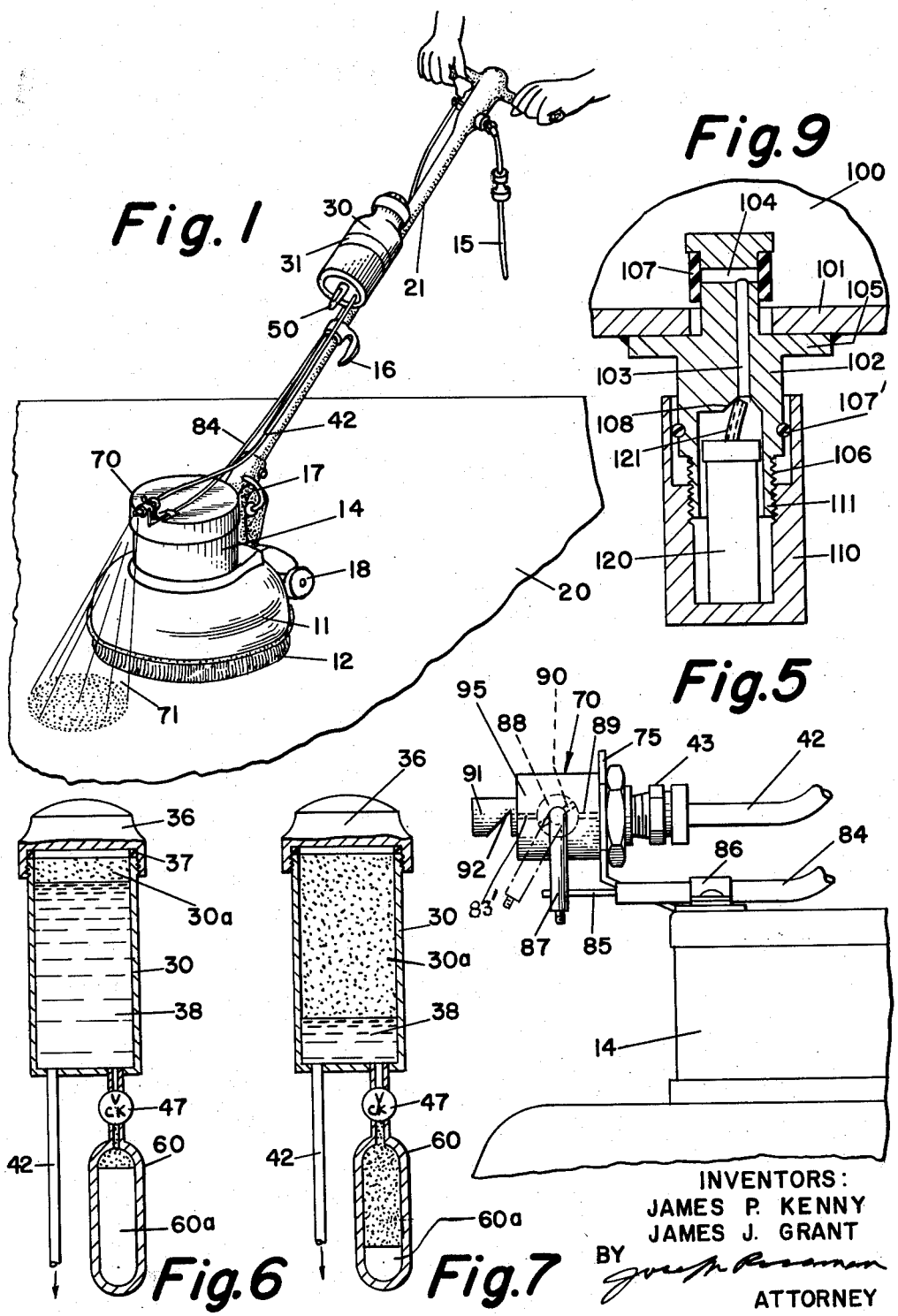
INVENTORS:
JAMES P. KENNY
JAMES J. GRANT
BY
ATTORNEY

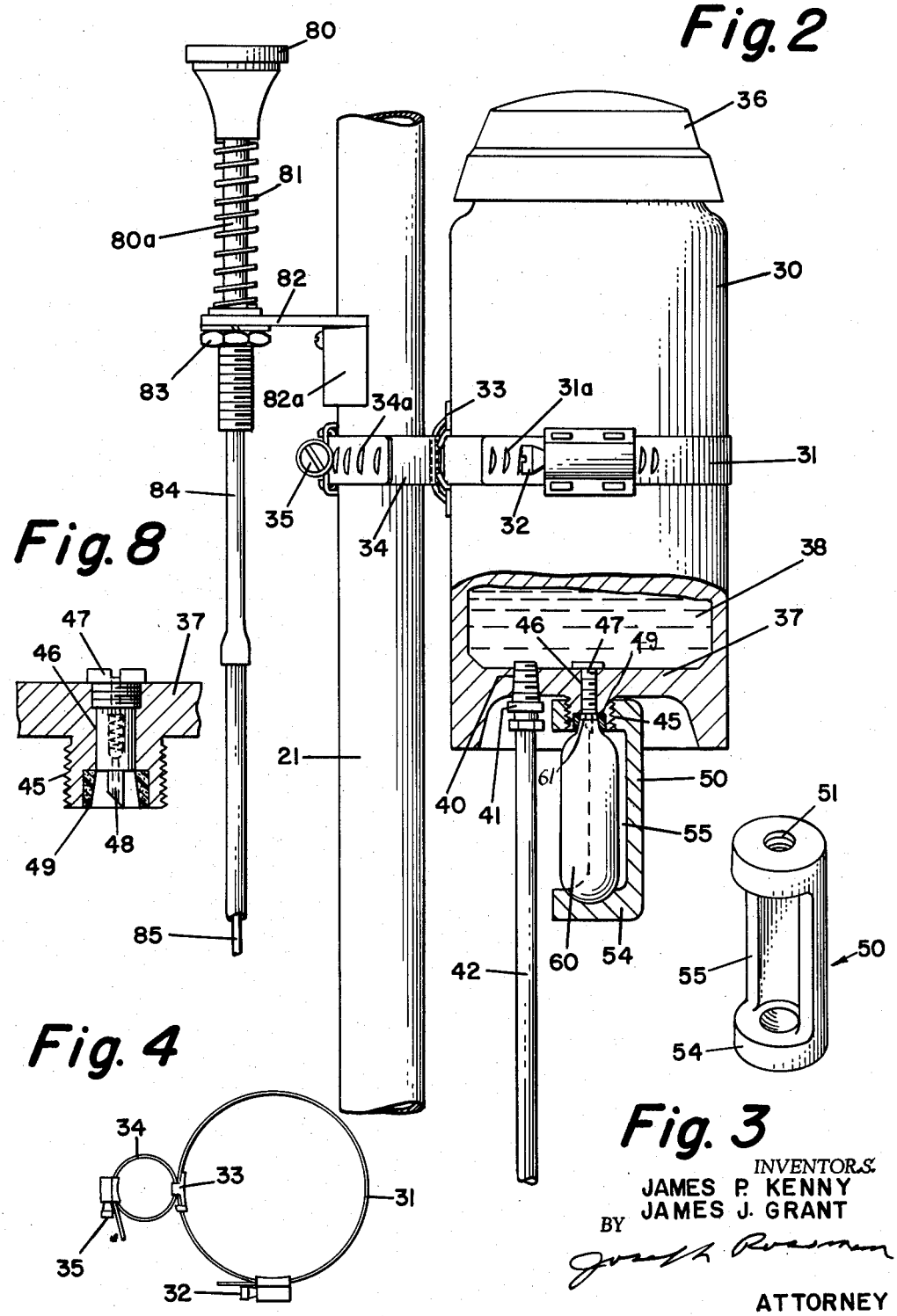

United States Patent Office 3,094,152
Patented June 18, 1963

3,094,152
LIQUID DISPENSING DEVICE FOR FLOOR MACHINES
James P. Kenny, Havertown, and James J. Grant, Lansdowne, Pa., assignors to Power Spray Company, Inc., a corporation of Pennsylvania
Filed Jan. 26, 1962, Ser. No. 169,009
2 Claims. (Cl. 141—19)

This invention relates to liquid dispensing means adapted to be attached to conventional floor cleaning and waxing machines.

The present invention has an object to provide means for spraying a wax composition or other floor treating composition in controlled quantity from a receptacle carried by the floor machine.

Another object of the invention is to provide manually operable control means for spraying the liquid composition while the floor machine is in use.

Another object of the invention is to provide a container which contains a supply of the liquid composition which can be sprayed through a nozzle upon a floor or other surface while the floor machine is operated.

A further object of the invention is to provide a reusable container for the liquid composition and means to pressurize the container so as to ensure that the entire liquid contents of the container are ejected, thus eliminating waste.

Another object of this invention resides in gas pressurizing means connected to the container for expelling the liquid contents therefrom.

Other objects and advantages of this invention will be apparent from the following specification and accompanying drawings, wherein FIGURE 1 is a perspective view of one embodiment of a floor machine provided with liquid dispensing means comprising a container having a liquid composition stored therein and control means for spraying a liquid composition on a floor, FIGURE 2 is an enlarged front view of the container, partly in section, including a gas pressurizing means and handle control means for the nozzle.

FIGURE 3 is a perspective view of the gas capsule holding means,

FIGURE 4 is a plan view of the metal straps for retaining the container on the floor machine, FIGURE 5 is an enlarged side elevational view of the nozzle for spraying the liquid, FIGURE 6 is a vertical sectional diagrammatic view showing the container and pressurizing gas capsule at the start of ejecting the liquid from the container, FIGURE 7 is a view similar to FIGURE 6 after most of the liquid in the container has been ejected, FIGURE 8 is an enlarged vertical sectional view of the check valve at the bottom of the container shown in FIGURE 2, and FIGURE 9 is a vertical sectional view of a modified check valve construction for the container.

Referring to FIGURE 1, a conventional electric portable floor cleaning machine is illustrated which comprises a body or frame member 11 carrying a rotatable brush or pad 12, operated by electric motor 14, connected to a suitable electric outlet by electric cord 15, shown cut off for convenience of illustration. The electric cord is of sufficient length to permit moving about of the floor machine during use and can be wound up around spaced brackets 16 and 17 on handle 21 when not in use. The body 11 of the floor machine is provided with wheels 18 so as to permit ready moving of the equipment to any desired location on floor 20. A handle 21 of suitable length is attached to the body 11 extending upwardly therefrom so that the unit may be manually moved to any desired position.

A cylindrical metal container 30 is attached to handle 21 by means of an adjustable metal strap 31 which surrounds container 30. The strap 31 can be suitably tightened on the container by rotating screw 32 engaging slots 31a in the strap 31. The strap 31 carries a bracket 33 which engages a loop of a second strap 34. Strap 34 embraces handle 21 and can be tightened by screw 35 which engages slots 34a in strap 34. The container 30 is thus removably fastened by the straps 31 and 34 on handle 21. Obviously, the container 30 may be retained on handle 21 by any other suitable means.

The container 30 is provided with an internally threaded cover 36 which is sealed by a gasket 37, as shown in FIGURE 6. The bottom wall 37 of the container 30 is provided with a threaded liquid outlet port or bore 40 adapted to receive a hose coupling 41, as shown in FIGURE 2, carried by a flexible hose 42. The bottom wall 37 of the container is also provided preferably medially with an integral threaded nipple 45 which extends externally of the bottom wall as shown in FIGURE 2. If desired, the nipple may be formed as a separate fitting which can be suitably retained in a suitable bore provided in the bottom of the container. The threaded nipple 45 is adapted to be received by a threaded bore 51 provided in the upper portion of removable capsule holder 50, shown in FIGURE 3. The capsule holder 50 is provided with an open curved body member 55 and a concavely-shaped bottom member 54, as shown in FIGURE 3, which is adapted to removably retain a gas capsule 60, as shown in FIGURE 2.

As shown in FIGURES 2 and 8, the nipple 45 and adjacent portion of bottom wall 37 of the container 30 is provided with an inlet bore or gas port 46 communicating with the interior of the container 30. The bore 46 is adapted to retain a suitable back pressure check-valve 47 which automatically seals the bore 46 against escape of liquid in the container. The nipple 45 also carries a hollow puncture needle 48 which is adapted to puncture a frangible closure 61 provided at the top of pressure capsule 60. A tapered elastomeric gasket 49 is seated at the open end of nipple 45, shown in FIGURE 8, and is adapted to seal the upper neck portion of capsule 60, as shown in FIGURE 2.

The container 30 is adapted to receive and store therein a liquid composition 38, such as a suitable liquid floor cleaning and waxing composition, which can be poured into the container by removing the top closure 36. The container 30 is adapted to be pressurized internally so as to eject the liquid 38 therein through the outlet port 40 and then through hose 42 which is connected to a nozzle 70, shown in FIGURES 1 and 5. Nozzle 70 is manually controlled by means to be described later to permit a conically-shaped stream 71 of liquid to be ejected on the floor 20. The nozzle 70 is carried by bracket 75 which is affixed to the motor body 14. In order to pressurize the container 30, a pressure capsule 60 of suitable size is provided which contains liquefied nitrous oxide, Freon-22, nitrogen or carbon dioxide. The capsule is positioned in holder 50, as shown in FIGURE 2, and the upper portion of holder 50 is threaded to nipple 45 of the container 30 until puncture needle 48 punctures the frangible closure 61 of the capsule. When nozzle 70 is actuated to eject a stream of liquid from the container, the liquefied gas 60a in capsule 60 will then volatilize and generate sufficient gas under pressure to pass upwardly into the container 30, through the liquid 38 in the container 30 and occupy the upper space 30a of the container, as shown diagrammatically in FIGURE 6. Sufficient gas pressure is generated by the liquefied gas in the capsule to act as a gas piston on the upper level of the liquid 38 in the container 30, whereby the liquid 38 will be forced through tube 42 and out of the nozzle 70. The capsule 60 contains sufficient liquefied gas so that it will continually generate gas pressure at the top of the container 30 as the liquid therein is being expelled. FIGURE 7 illustrates a stage at which most of the liquid 38 has been expelled from the container, but sufficient liquefied gas 60a is still left in capsule 60 to generate sufficient pressure in the top space 30a of the container to expel the entire liquid content of the container 30. In event sufficient pressure is not developed in the container, the holder 50 can be readily removed and a new gas capsule replaced therein. The holder is then threaded on the nipple 45 so as to cause needle 48 to puncture the frangible closure 61 of the capsule as previously described. Likewise, if the contents in the container are used up, the container can be readily and quickly refilled and pressurized by a pressure capsule as previously described.

The nozzle 70 is controlled manually by a push handle 80 connected to a rod 80a which is surrounded by a spring 81 that normally tends to move handle 80 upwardly in relation to bracket 82, attached to handle 21 of the floor machine by bracket 82. The end of a flexible tube 84 is retained on bracket 82 by a sleeve and nut 83. Rod 80a is connected to one end of a Bowden wire 85 which is slidably retained within tube 84. The other free end of wire 85 is connected to lever 87, as shown in FIGURE 5. Lever 87 is connected to a rotatable ball valve 88 which is provided with a flow channel 90. Ball valve 88 is retained in a valve housing 95 which is provided with spaced inlet port and outlet port 83' which are adapted to align with flow channel 90. The end of tube is connected by a coupling 43 to the valve housing 95. When push handle 80 is manually actuated, ball valve 88 can be rotated so as to align flow channel 90 with the inlet port 89 and outlet port 83' and thus permit liquid supplied under pressure through tube 42 to be ejected against concavely-shaped baffle 91 which is provided with an inclined face 92 so as to fan out the ejected liquid stream into a conically-shaped spray 71, as shown in FIGURE 1.

FIGURE 9 illustrates a modified construction for coupling the pressure capsule to the container, according to which a cylindrical fitting 102 is provided having flanges 105 which are welded to the bottom 101 of the container 100. The fitting 102 is provided with a vertically extending bore 103 which is offset from the longitudinal axis of the fitting 102. The upper end of bore 103 terminates in a lateral bore 104. An expansible elastomeric band 107 embraces the lateral bore 104. The lower end 111 of the fitting is threaded at 106 and is also provided with an elastic sealing O-ring 107'. The interior lower end of fitting 102 is provided with a conical surface 108 having its longitudinal axis slightly offset from the central axis of the fitting. A cylindrical holder 110 is provided for retaining a suitable gas pressure capsule 120 provided with a conventional toggle-type valve actuated by stem 121 for releasing gas under pressure in the capsule. The capsule holder 110 is internally threaded for engaging with the threaded end 106 of fitting 102. When the holder is coupled into a tight fit with fitting 102, the stem 121 will contact the inclined surface 108 of the fitting. This will cause stem 121 to be deflected laterally so as to release the gas within the capsule 120. The pressurized gas from capsule 120 will then flow through bore 103 and through lateral bore 104 under sufficient pressure to expand flexible band 107 and thus permit the gas to flow into the container 100. Back pressure within the container will automatically cause band 107 to contract and seal lateral bore 104 and thus prevent flow of liquid from the container.

It will be apparent from the foregoing description of an illustrative embodiment of our invention that conventional portable electric driven floor cleaning and polishing machines can be provided with simple and relatively inexpensive means to carry a supply of liquid cleaning or waxing composition in a suitable container carried on the handle of the floor machine and simple means is provided to pressurize the container by use of a liquefied gas capsule which can be readily fitted to the container. Furthermore, manual means are provided to control a nozzle connected by a flexible hose to the container to spray the liquid on the floor by simple manual control of the operator while the floor machine is being operated.

It will be evident from the foregoing detailed description of the invention that the container, capsule holder, nozzle and manual control elements can be merchandized as an accessory for quick and easy mounting on any commercially available floor cleaning or polishing machines. The several parts can be readily assembled on the floor machine and can be put to immediate use for supplying a spray of suitable floor cleaning or polishing composition on the floor in front of the rotary brush so as to effectively apply the composition to the floor as the floor machine is being moved about and operated. The present invention makes it possible to apply a liquid composition to the floor without extra manual manipulations of the operator, eliminating stooping or bending as well as spilling, splashing or wastage of the cleaning liquid. Furthermore, considerable time is saved in cleaning or polishing a given floor area since the present apparatus can be manually controlled from the handle of the floor machine.

It is to be understood that modifications and equivalent elements other than those specifically described herein may be used to accomplish the same results as accomplished by the illustrative embodiment, such modifications being included within the scope of the appended claims.

We claim:

1. A liquid dispensing device for attachment to a portable floor machine having a working head supported on a floor and a handle projecting upwardly therefrom for manual movement of the floor machine, said dispensing device comprising a container for storing a liquid composition therein, a removable top closure for said container for refilling said container with liquid composition, an outlet opening in the bottom wall of said container for passage therefrom of liquid stored in said container, a liquid supply tube connected to said outlet opening, a gas inlet port in the bottom of said container, a capsule containing liquefied gas, said capsule being provided with a frangible seal, a removable holder for retaining said capsule, said holder being open at one side thereof for the insertion and removal of the capsule, said holder being provided with coupling means for connecting the capsule to the gas inlet port of the container, puncture means positioned in said gas inlet port for puncturing said frangible seal upon connecting said capsule to said inlet port, a nozzle carried on the working head of the floor machine for projecting a stream of liquid forwardly of the working head of the floor machine, said liquid supply tube being connected to said nozzle, valve means communicating with said nozzle for controlling the flow of liquid to said nozzle, and manual valve control means carried on said handle for opening and closing said valve means.

2. A liquid dispensing device for attachment to a portable floor machine having a handle projecting therefrom, said dispensing device comprising a container attached to said handle for storing a liquid composition therein, an outlet opening in the bottom of said container for passage therefrom of liquid stored in said container, a liquid supply tube connected to said outlet, said tube being connected to a nozzle for ejecting a stream of liquid supplied under pressure from said container, a gas inlet port in the bottom of said container, a cylindrical fitting connected to said inlet port, said fitting being provided with a vertically extending inlet port, said port being offset from the vertical longitudinal axis of said fitting, said inlet port terminating in an intersecting horizontal inlet port provided in said fitting, an elastic sealing band embracing the outlet openings of said horizontal inlet port, a capsule holder adapted to be connected to said fitting, said capsule containing a liquefied gas therein and a toggle valve stem for opening said capsule, said longitudinal inlet port being provided with an inclined surface adapted to be contacted by said valve stem and thereby deflect same to open said capsule, whereby gas generated under pressure by said capsule will flow through said vertical inlet port and horizontal port and escape past said sealing band into the receptacle, valve means for controlling the flow of liquid through said liquid supply tube and manual control means attached to the handle of the floor machine for opening and closing said valve means.

References Cited in the file of this patent

UNITED STATES PATENTS

| | | |
|---|---|---|
| 2,596,415 | Kochner | May 13, 1952 |
| 3,021,850 | Smith et al. | Feb. 20, 1962 |
| 3,055,031 | Rachlin | Sept. 25, 1962 |

FOREIGN PATENTS

| | | |
|---|---|---|
| 1,236,218 | France | Sept. 8, 1959 |